(12) United States Patent
Weigman et al.

(10) Patent No.: US 10,586,974 B2
(45) Date of Patent: Mar. 10, 2020

(54) LASER ABLATION FOR MANUFACTURE OF BATTERY CELLS

(71) Applicant: Dyson Technology Limited, Wiltshire (GB)

(72) Inventors: Thomas V. Weigman, St. Anthony, MN (US); Svetlana Lukich, Longwood, FL (US); Ann Marie Sastry, Ann Arbor, MI (US); Chia-Wei Wang, Ypsilanti, MI (US); Yen-Hung Chen, Ann Arbor, MI (US); Xiangchun Zhang, Ann Arbor, MI (US); HyonCheol Kim, Ann Arbor, MI (US); Myoungdo Chung, Ann Arbor, MI (US)

(73) Assignee: Dyson Technology Limited, Malmesbury, Wiltshire (GB)

( * ) Notice: Subject to any disclaimer, the term of this patent is extended or adjusted under 35 U.S.C. 154(b) by 161 days.

(21) Appl. No.: 15/705,430

(22) Filed: Sep. 15, 2017

(65) Prior Publication Data
US 2019/0088954 A1 Mar. 21, 2019

(51) Int. Cl.
*H01M 4/04* (2006.01)
*H01M 10/058* (2010.01)
*H01M 4/131* (2010.01)
*H01M 10/52* (2006.01)
*H01M 10/04* (2006.01)
*H01M 4/1391* (2010.01)
*H01M 10/0562* (2010.01)
*H01M 10/052* (2010.01)
*H01M 4/583* (2010.01)
*H01M 4/58* (2010.01)
*H01M 4/48* (2010.01)

(52) U.S. Cl.
CPC ............ *H01M 4/04* (2013.01); *H01M 4/131* (2013.01); *H01M 4/1391* (2013.01); *H01M 10/04* (2013.01); *H01M 10/052* (2013.01); *H01M 10/058* (2013.01); *H01M 10/0562* (2013.01); *H01M 4/48* (2013.01); *H01M 4/58* (2013.01); *H01M 4/583* (2013.01); *H01M 2300/0068* (2013.01)

(58) Field of Classification Search
None
See application file for complete search history.

(56) References Cited

U.S. PATENT DOCUMENTS

| 7,862,627 B2 | 1/2011 | Li et al. |
| 8,168,318 B2 | 5/2012 | Kwak et al. |
| 2009/0208671 A1* | 8/2009 | Nieh ............... C23C 14/025 427/596 |

FOREIGN PATENT DOCUMENTS

| EP | 2434567 | * 3/2012 |
| WO | 2015/183832 | 12/2015 |

OTHER PUBLICATIONS

International Search Report and Written Opinion dated Nov. 6, 2018, directed to International Application No. PCT/GB2018/052547; 10 pages.

* cited by examiner

*Primary Examiner* — Sarah A. Slifka
(74) *Attorney, Agent, or Firm* — Morrison & Foerster LLP

(57) ABSTRACT

A pulsed laser can be used to ablate the desired thin film layers at a desired location, to a desired depth, without impinging significantly upon other layers. The battery cell layer order may be optionally optimized to aid in ease of laser ablation. The laser process can isolate layers of thin film within sufficient proximity to at least one edge of the final thin film battery stack to optimize active battery area.

27 Claims, 13 Drawing Sheets

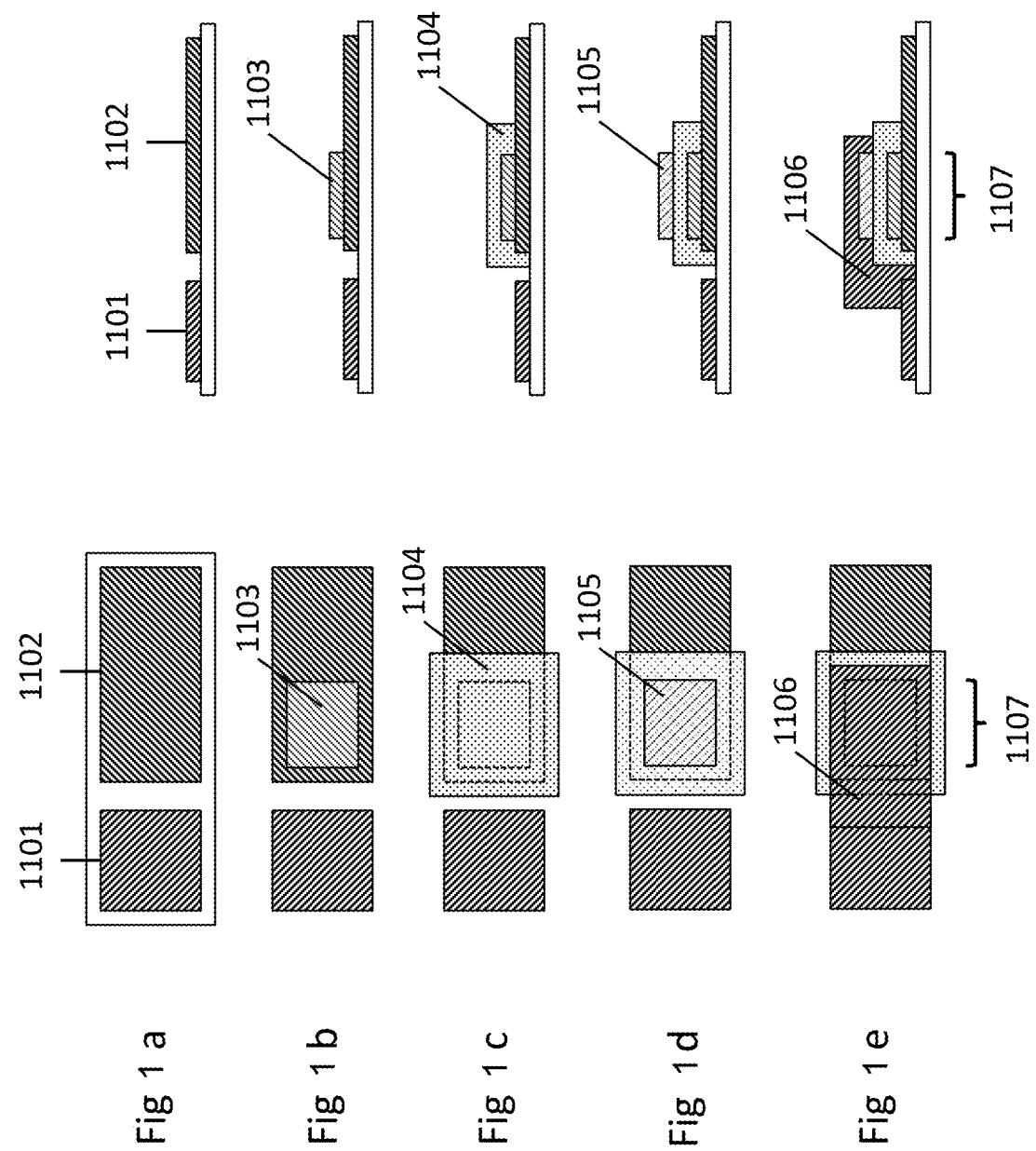

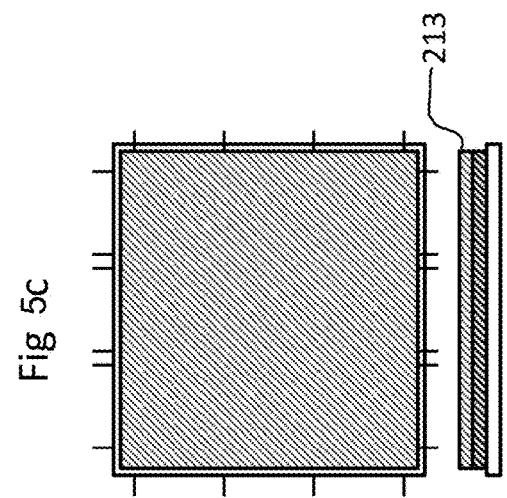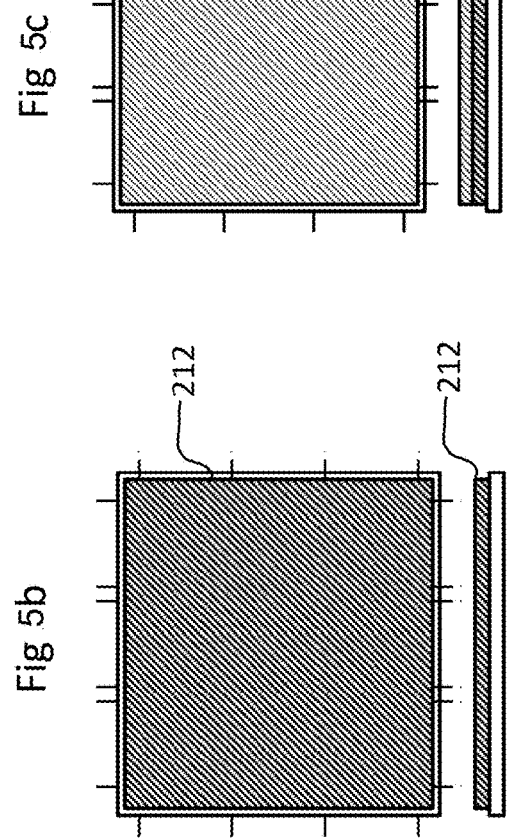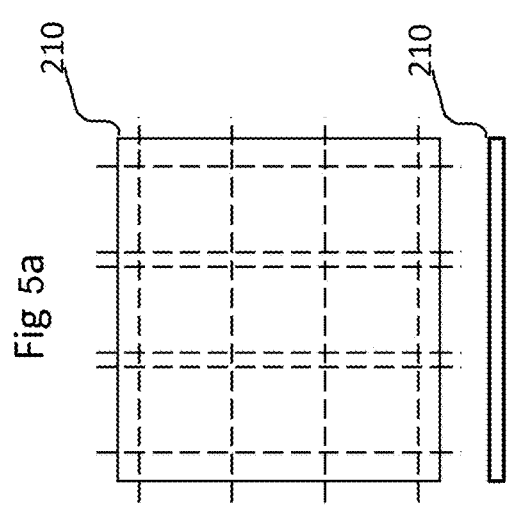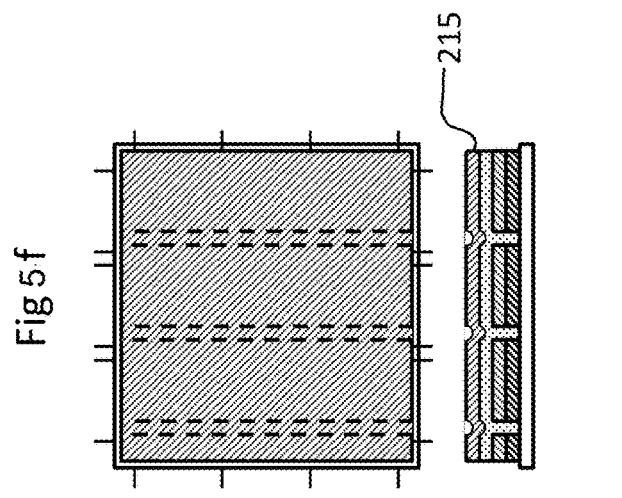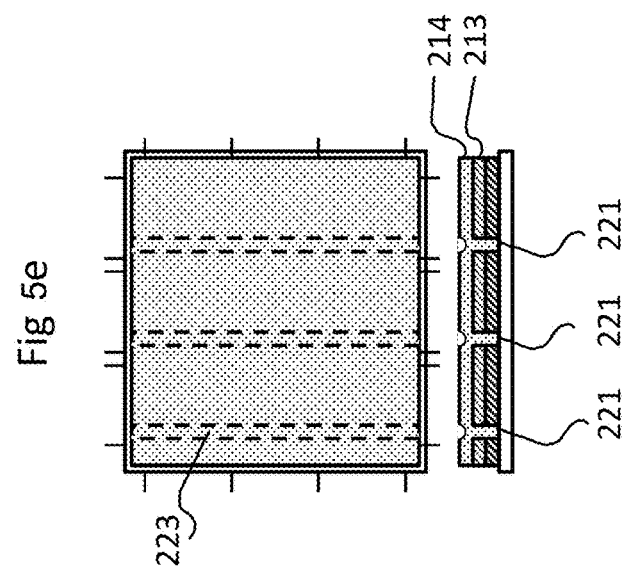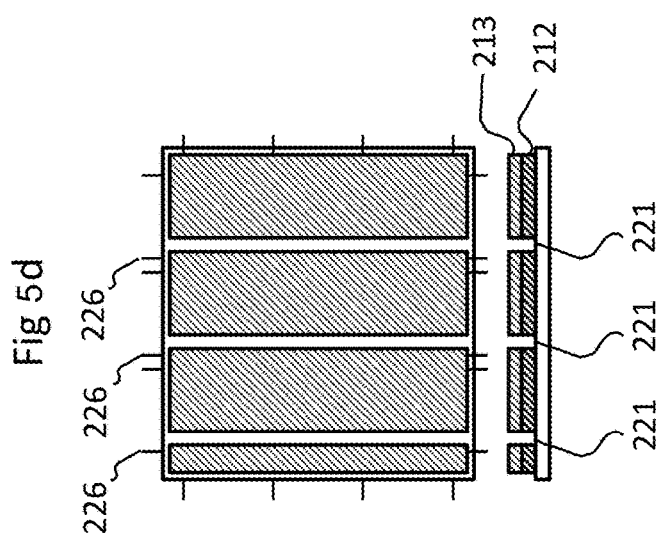

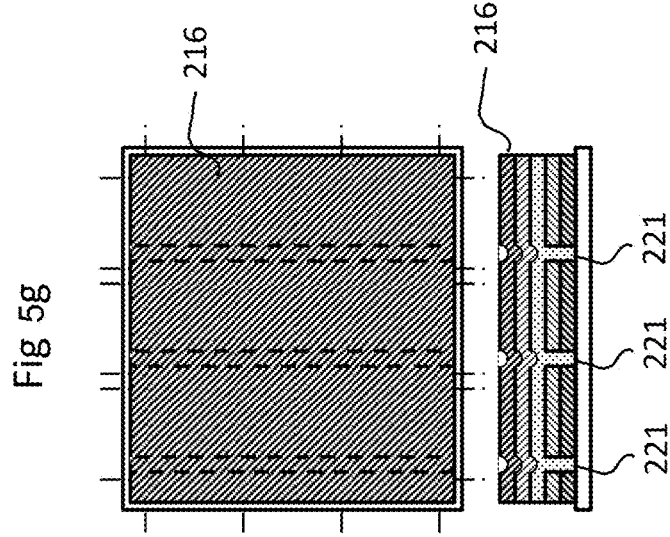
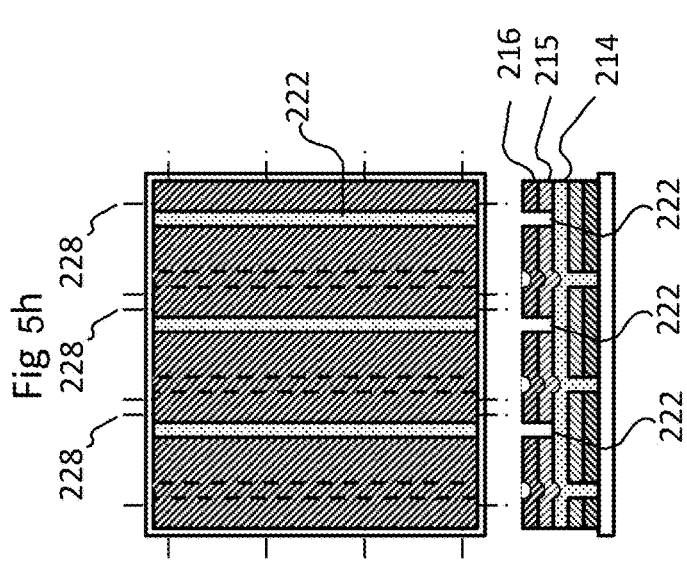
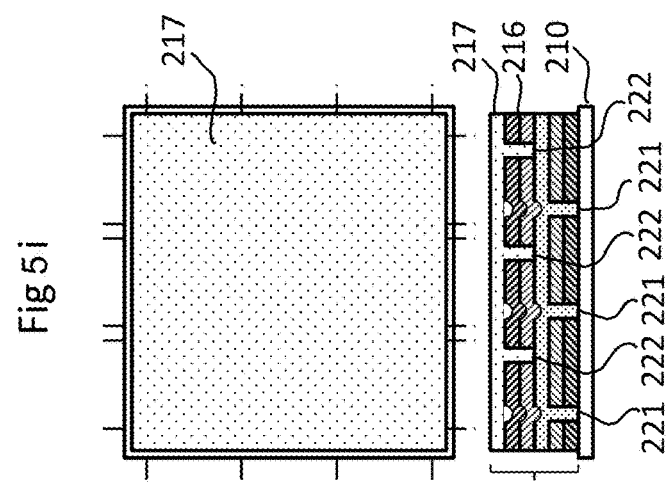
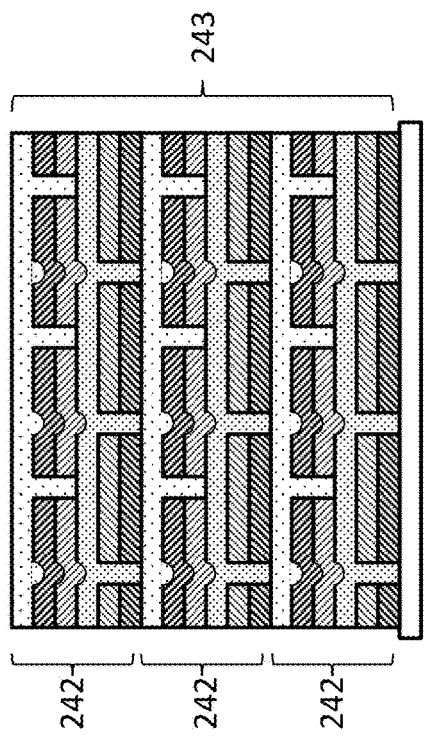

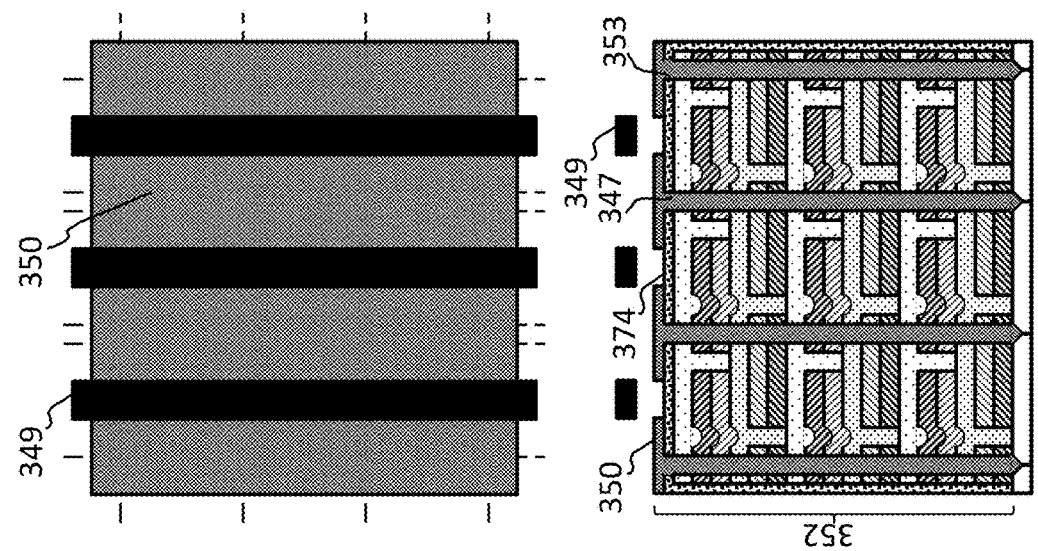
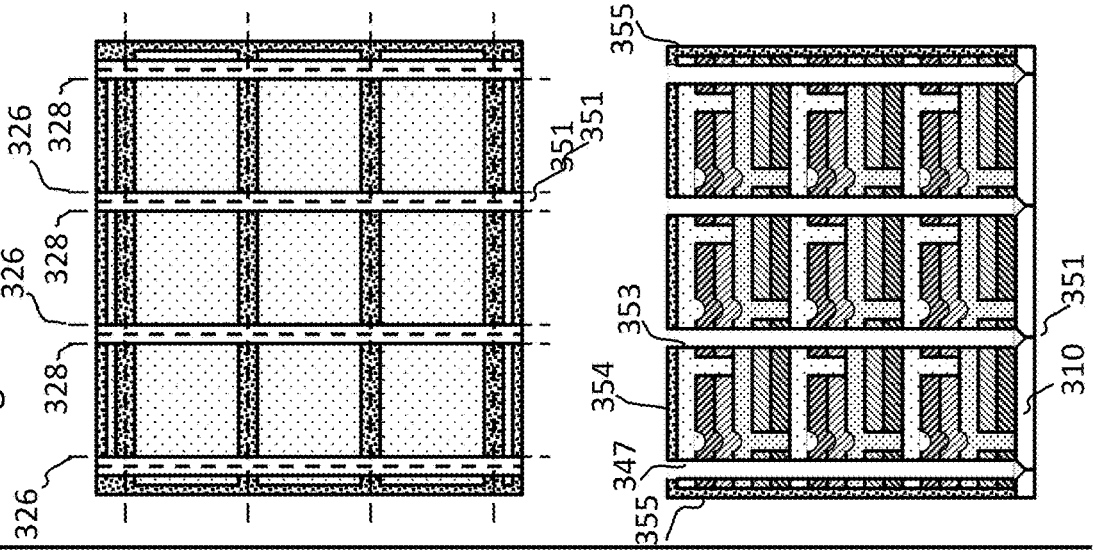
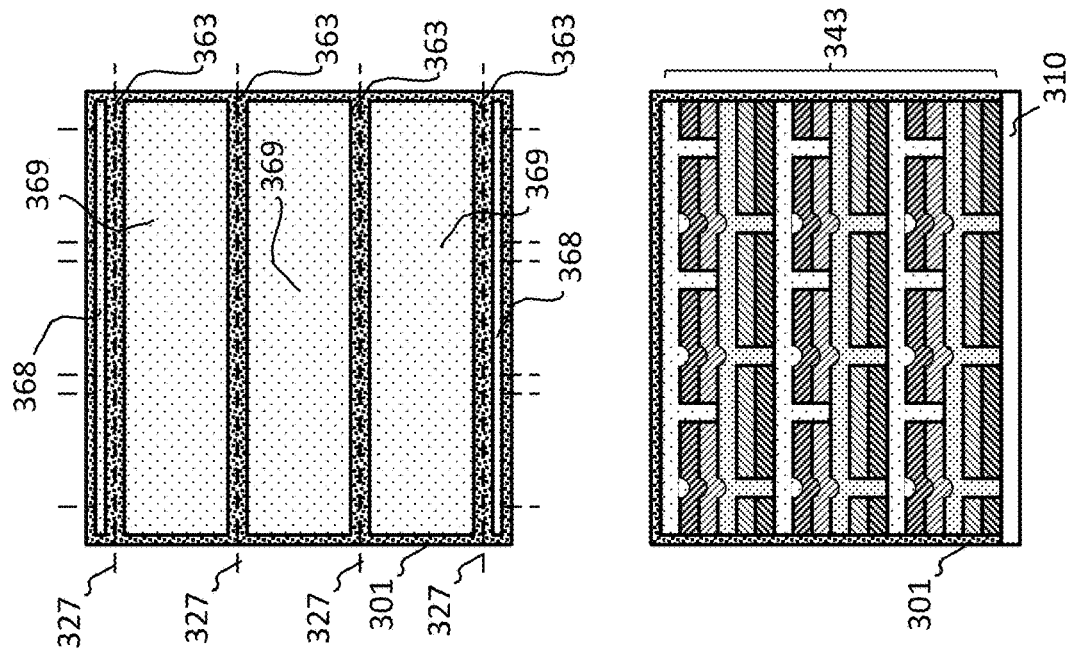

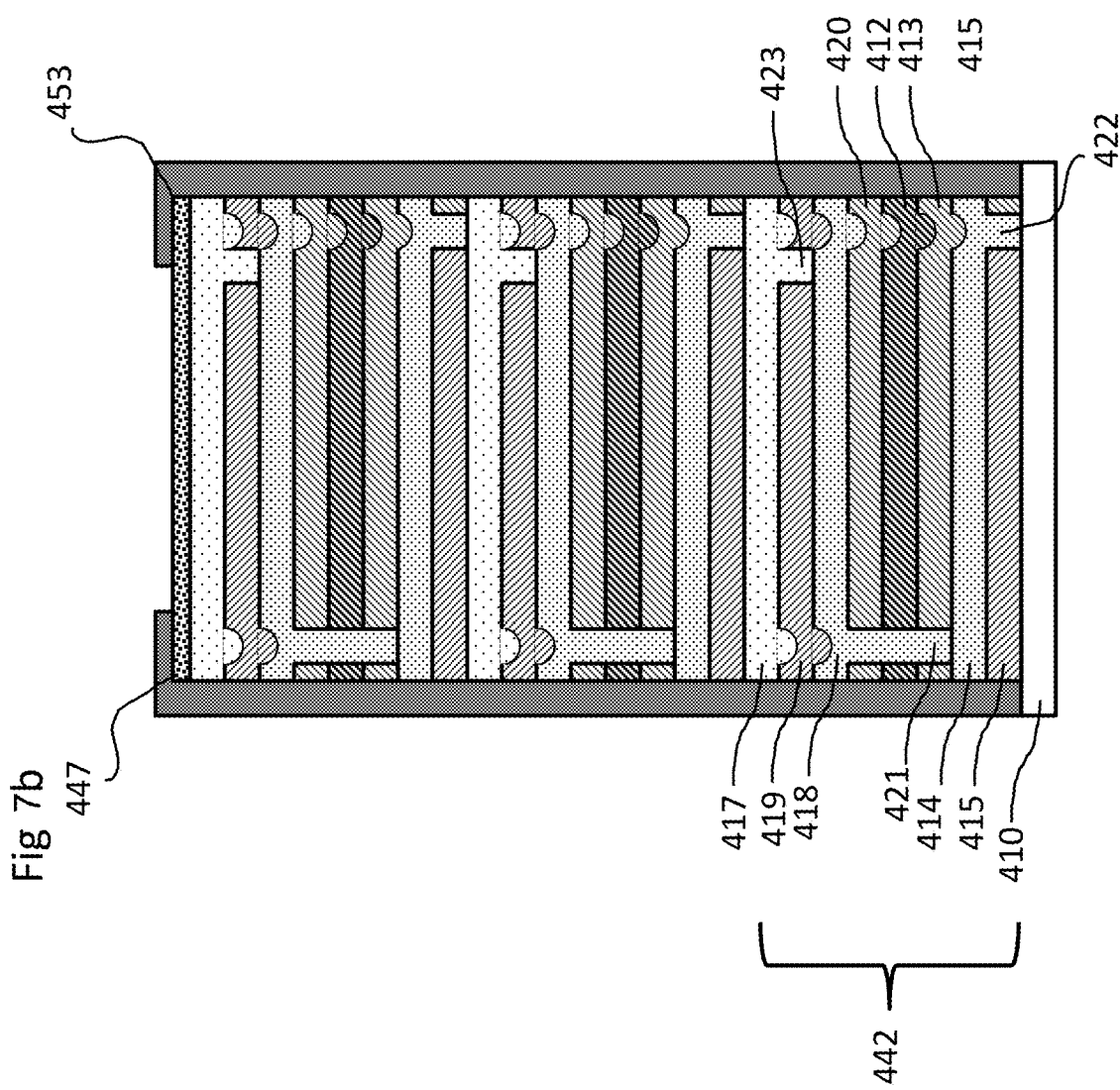
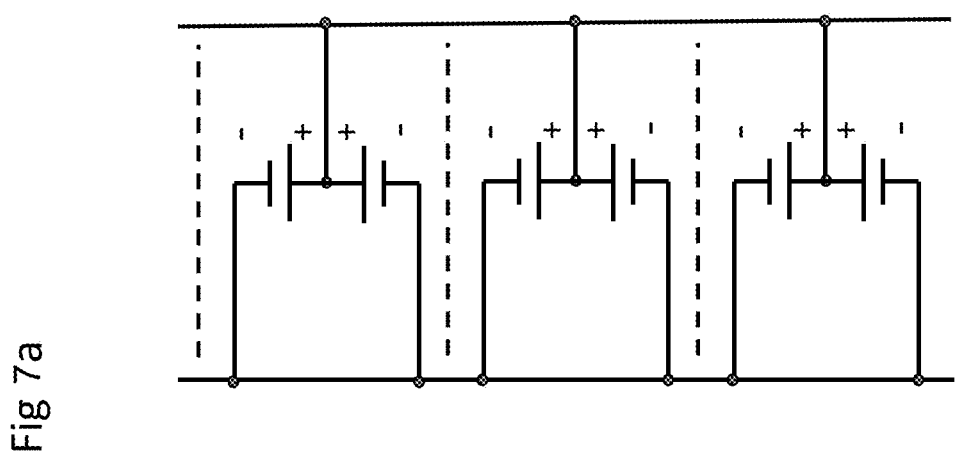

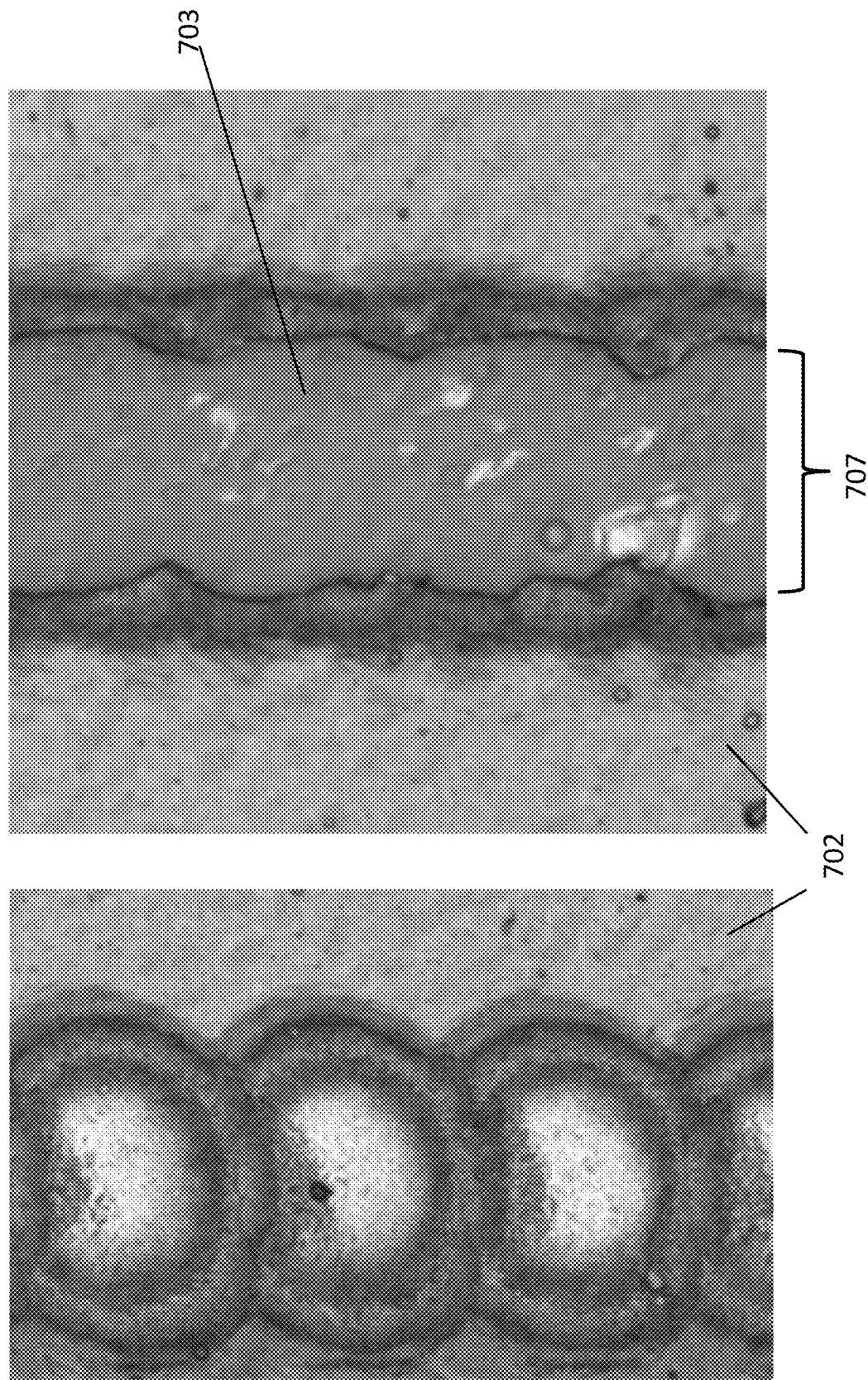

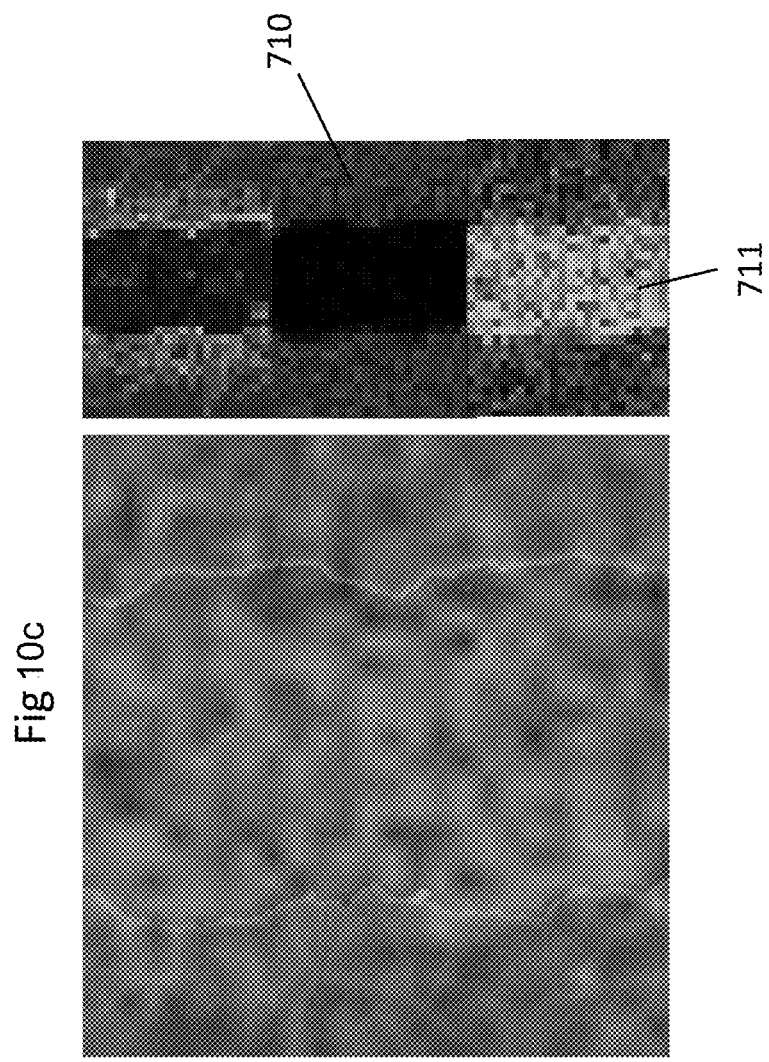

LASER ABLATION FOR MANUFACTURE OF BATTERY CELLS

FIELD OF THE INVENTION

The present invention relates to techniques for manufacturing electrochemical devices. More specifically, the present invention provides a method of manufacturing batteries using laser ablation.

BACKGROUND OF THE INVENTION

Batteries can be used for a variety of applications such as portable electronics (cell phones, personal digital assistants, music players, video cameras, and the like), power tools, power supplies for military use (communications, lighting, imaging and the like), power supplies for aerospace applications (power for satellites), and power supplies for vehicle applications (hybrid electric vehicles, plug-in hybrid electric vehicles, and fully electric vehicles). The design of such batteries is also applicable to cases in which the battery is not the only power supply in the system, and additional power is provided by a fuel cell, other battery, IC engine or other combustion device, capacitor, solar cell, etc.

Solid state cells are generally in the experimental state, have been difficult to make, and have not been successfully produced in large scale. Although promising, solid state cells have not been achieved due to limitations in cell structures and manufacturing techniques.

Solid state batteries have been proven to have several advantages over conventional batteries using liquid electrolyte in lab settings. Safety is the foremost one. Solid state battery is intrinsically more stable than liquid electrolyte cells since it does not contain a liquid that can cause an undesirable reaction, resulting thermal runaway, and an explosion in the worst case. Solid state battery can store more energy for the same volume or same mass than conventional batteries.

Despite of these outstanding properties of solid state batteries, there are challenges to address in the future to make this type of batteries available in the market. To exploit the compactness and high energy density, packaging of such batteries should be improved. To be used in variety of applications such as consumer electronics, RFID, etc., large area and fast film deposition techniques at low cost should be developed.

SUMMARY OF THE INVENTION

Techniques related to manufacture of electrochemical cells are provided. More particularly, the present invention provides a method and device for fabricating a solid-state thin film battery device. Merely by way of example, the invention has been provided with use of lithium based cells, but it would be recognized that other materials such as zinc, silver, copper and nickel could be designed in the same or like fashion.

In an embodiment, a method is described for using a pulsed laser to isolate and allow for electrical termination of individual solid-state thin film battery cell layers in the process of continuously depositing multiple solid-state thin film battery cells. The battery cell layers may contain cathode current collector layers, cathode layers, electrolyte layers, anode layers, anode current collector layers, and insulating layers.

In an embodiment, for isolation, a pulsed laser is used to ablate the desired thin film layers at a desired location, to a desired depth, without impinging significantly upon other layers. The battery cell layer order may be optionally optimized to aid in ease of laser ablation. The laser process will isolate layers of thin film within sufficient proximity to at least one edge of the final thin film battery stack to optimize active battery area.

In an embodiment, the laser ablation process serves to isolate the anode and the cathode from one, or both sides of the battery. The electrolyte and insulating interlayers are not ablated and serve to further isolate and protect the subsequent layers of the battery. When one battery stack is complete, all electrode layers (anode, anode current collector, cathode, cathode current collector) are either selectively isolated or terminated, allowing a connection of the stacked cells; including parallel, serial, or a combination thereof. Electrical connection to subsequently deposited battery stacks may be made from the sides or top of the previous battery stack.

As a further advantage, due to the ability to deposit large expanses of material, the laser isolation and electrical termination can be performed quickly and efficiently, using common lines between adjacent cells to decrease overall cycle time, aiding high volume manufacturing.

In some embodiments, a method for manufacturing a solid state battery comprises: providing a carrier substrate having a first surface region; coating the first surface region; forming a first electrode member overlying the first surface region; forming any one of an anode current collector, a cathode current collector, an anode member, or a cathode member, or any combination overlying the first electrode member; subjecting a first spatial region to a beam of electromagnetic radiation in one or more pulses causing formation of a first opening through a first thickness of the first electrode member stopping at the first surface region. In some embodiments, the first electrode is isolated from a first side of the battery.

In some embodiments, the method comprises subjecting a second spatial region overlying the first electrode member to a beam of electromagnetic radiation in one or more pulses causing formation of a second opening through a second thickness of the first electrode member stopping at the first surface region. In some embodiments, the method comprises forming a second electrode member overlying the first electrode member to form an anode or a cathode. In some embodiments, the method comprises forming a first electrolyte material overlying the first electrode member. In some embodiments, the method comprises forming an Nth electrode member overlying the first electrode member, where N is an integer greater than 10.

In some embodiments, the beam is provided from a laser source selected from one of a diode pumped solid state laser, a fiber laser, a semiconductor laser, or an excimer laser. In some embodiments, the first spatial region is provided within a distance from at least one outer edge of the completed electrochemical cell such that the distance is less than 25% of a width of the completed electrochemical cell in order to reduce a loss of active energy density of the completed electrochemical cell. In some embodiments, a plurality of spatial regions are formed, each of which is offset from another by less than 25% of a width of the completed electrochemical cell such that an upper recessed region is formed off-set from a lower recessed region. In some embodiments, the first spatial region is shared among a pair of neighboring cells such that the opening is provided using a single ablation process.

In some embodiments, the method comprises depositing a fill material overlying the first opening to form a slightly recessed region; and forming an insulating material overlying the slightly recessed region to form a planarized surface region thereof. In some embodiments, the beam is focused to a beam spot size of less than 5 mm in at least one axis in order to minimize the loss of active energy density of the electrochemical cell. In some embodiments, the anode current collector and/or cathode current collector is configured as a diffusion barrier region. In some embodiments, the electrochemical cell is a solid state thin film battery deposited in a state of charge between 0% and 100%.

In some embodiments, the forming an electrode material of the cathode current collector comprises depositing a material selected from at least one of Au, Pt, Cu, Ni, Ni—Cr, V, Al, Ti, Mn; wherein the forming an electrode surface region of a cathode material comprises depositing a material selected from at least one of Mg doped LiNiO2, La doped LiMn2O4, La doped LiCoO2, LiMn2O4, LiNixCoyMn1-x-yO2, LiNixCoyAl1-x-yO2, LiCuxMn2-xO4, LiFexMn2-xO4, LiNixMn2-xO4, LiCoxMn2-xO4, LiFePO4, LiMnPO4, LiNiPO4, LiCoPO4, LiNiO2, LiCoO2, LiV2O5, LiAlxCo1-xO2, S; wherein the forming of an electrolyte comprises depositing a material selected from at least one of LiSON, LixLa1-xZrO3, LixLa1-xTiO3, LiAlGePO4, LiAlTiPO4, LiSiCON, Li1.3Al0.3Ti1.7(PO4)3, 0.5LiTaO3+ 0.5SrTiO3, Li0.34La0.51TiO2.94, LiALCl4, Li7SiPO8, Li9AlSiO8, Li3PO4, Li3SP4, LiPON, Li7La3Zr2O12, Li1.5Al0.5Ge1.5(PO4)3, Li6PS5Cl, Li5Na3Nb2O12; wherein the forming an electrode surface region of an anode material comprises depositing a material selected from at least one of LixMg1-x, LixAl1-x, Sn3N4, SnNxOy, GexO, Li, LiC6, LixSn, Li—Sn—Al, Li4Ti5O12, Li—Sb, Li—Bi, Li—In, Li—Si; wherein the forming an electrode surface region of an anode current collector material comprises depositing a material selected from at least one of Au, Pt, Cu, Ni, Ni—Cr, V, Al, Ti, Mn; and wherein forming an insulating interlayer surface region comprises depositing a material selected from at least one of TPGDA (Tripropylene Glycol Diacrylate), TMPTA (Trimethylolpropane Triacrylate), PMPTMA (Trimethylolpropane Trimethacrylate), PETA (Pentaerythritol Triacrylate), DPGDA (Dipropylene Glycol Diacrylate), HDDA (1,6-Hexanediol Diacrylate).

BRIEF DESCRIPTION OF THE DRAWINGS

FIG. 1a-e illustrate a simplified conventional masked solid-state thin film battery stack.

FIG. 5a-j are simplified diagrams illustrating a method for fabricating and isolating a multi-layered solid-state battery device according to an embodiment of the present invention.

FIG. 6a-c are simplified diagrams illustrating a method for fabricating and electrically terminating a multi-layered solid-state battery device according to an embodiment of the present invention.

FIGS. 7a & b are simplified diagrams illustrating a method for fabricating and isolating an alternating parallel multi-layered solid-state battery device according to an alternate embodiment of the present invention.

FIG. 10a-c are micrographs of laser ablation according to an example of the present invention showing a stack composed of a first cathode, a cathode current collector, and a second cathode, laser ablated to the underlying electrolyte.

DETAILED DESCRIPTION OF THE INVENTION

Figure 2C:
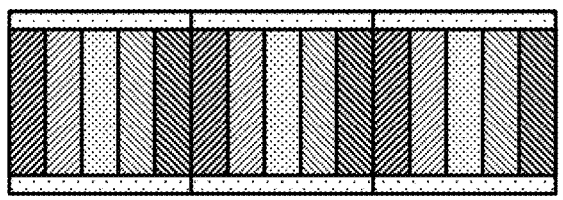
FIG. 2a-c shows a simplified conventional maskless laser pattering operation.

Potential advantages of solid-state batteries include low parasitic mass due to lack of a liquid electrolyte, and the ability to increase capacity by using known material deposition techniques to deposit multiple stacks of batteries on top of each other. To this point, high volume manufacturing of solid-state thin film batteries has been limited to small, low capacity batteries.

Although the properties intrinsic to solid-state thin film batteries provide high energy density, little concern is given in the current art for maximizing the active volume of the thin film battery. High accuracy masks are often used in the manufacturing of solid-state thin film batteries, but the disadvantages are well known. Large margins around the cell must be allowed for mask alignment and deposition overspray, which reduces the potential energy density of the battery. Masks add cost and complexity, and are difficult to scale accurately to large areas. Masks may also be a source of reactants and contamination.

When active volume is considered in the conventional technique by using maskless patterning such as laser ablation, electrical isolation and termination techniques limit the practical number of thin film batteries that may be stacked. Laser ablation of the full cell may provide isolated solid-state thin film batteries that are electrically terminated through the bottom substrate and top current collector. This may maximize the active volume for a single battery stack, but does not scale well when multiple battery stacks are either serially deposited or laminated on top of each other. Voltage would either be higher than practical, or additional electrical connections would need to be added to provide a parallel connection, adding parasitic mass.

Missing in the current art is a high volume manufacturing method for creating multiply stacked solid-state thin film batteries, electrically isolated and terminated, with minimized parasitic mass. Pulsed lasers have been used to process thin film batteries in several applications, including cutting through thin film batteries and substrates (U.S. Pat. No. 7,862,627) and maskless patterning of thin film batteries (U.S. Pat. No. 8,168,318).

For purposes of illustration, a masked thin film battery structure is shown in FIG. 1. Using masks, an anode current collector (1101) and cathode current collector (1102) is deposited onto a substrate, followed by cathode (1103), electrolyte (1104), anode (1105), and a conductive protective coating (1106). The deposition areas must be spaced far enough apart to account for mask placement accuracy, mask sagging, and deposition overspray. The electrolyte (1104) is typically oversized to prevent shorting between the anode (1103) and cathode (1105). The conductive protective coating (1106) is extended over the large electrolyte area in order to contact and protect the anode. The active area (1107) is actually only a small portion of the total battery size. Laser ablation is a method that may be considered to minimize this extra mass.

Figure 2B:
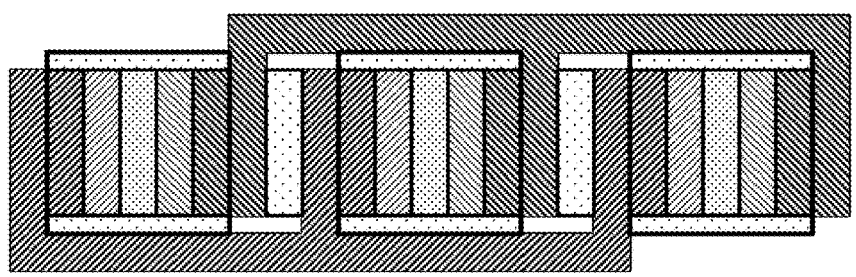
Figure 2A:
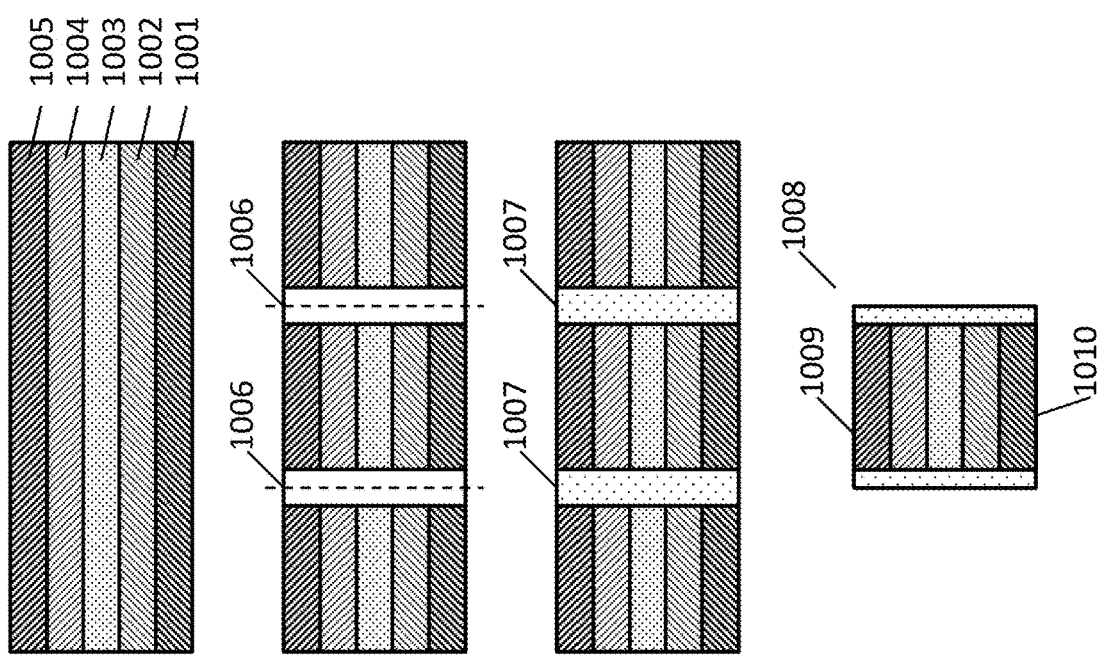

In FIG. 2, a thin film battery stack is processed in its entirety by a maskless laser patterning operation. Over a conductive substrate (1001), a cathode (1002) is deposited, followed by electrolyte (1003), anode (1004), and a protective coating (1005) (a conductive protective coating may function as the anode current collector). The full stack is then laser cut (1006) and the laser cuts are sealed with an insulating encapsulant (1007). The battery is then separated along the insulating encapsulant (1007) leaving the individual thin film battery cell (1008). The top (1009) and bottom (1010) surfaces of the thin film battery provide electrical termination of the battery. External connections could expand capacity by joining these batteries together in parallel as shown in FIG. 2b, but these connections would add mass and complexity. If desired, multiple stacks of these batteries may be sequentially deposited or externally connected to provide a battery with a larger capacity as shown in FIG. 2c. Subsequent deposited layers or simple external connection would add batteries by a series connection. In this case, the voltage will increase with each battery deposited. As common electronics typically do not require large voltages, but rather larger current generation achieved from a parallel connection, a more flexible and approach to laser isolation is desired. This approach should allow selection of serial or parallel electrical termination during the battery deposition, as well as minimizing parasitic mass.

The teachings for the present invention describe isolating the electrode layers from one or more opposing sides of the thin film solid-state battery, allowing electrical termination to the sides of the battery. As the isolation is selectable on each layer, parallel and/or serial connection of sequentially deposited thin film battery stacks is possible. The isolation is performed in close proximity to the defined edge of the battery so that active area is maximized. As the laser ablation process creates a trench of missing material, the material on subsequently deposited layers will be slightly recessed. Care is taken to avoid "stack up" of these trenches by offsetting the position of the ablation, when necessary. The fluid nature of the insulating interlayer is used to level the individual battery cell layers so the stack up effect does not propagate to subsequent layers, causing undesirable geometric problems.

Figure 3:
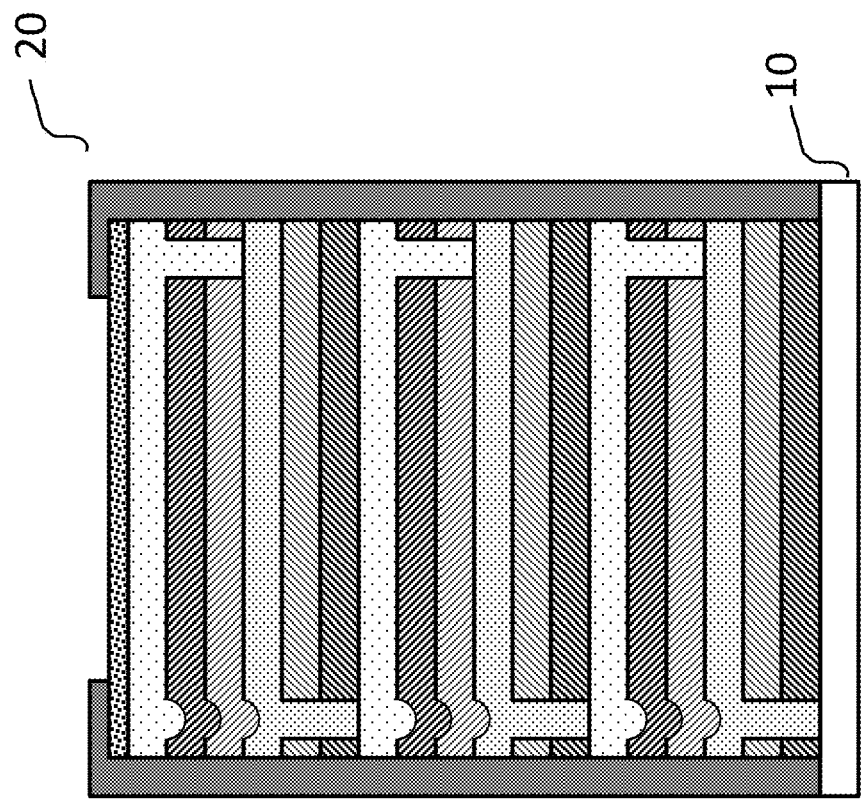
FIG. 3 shows an embodiment of the current invention, a stack of solid-state thin film battery cells, isolated and terminated by laser ablation.
Figure 4:
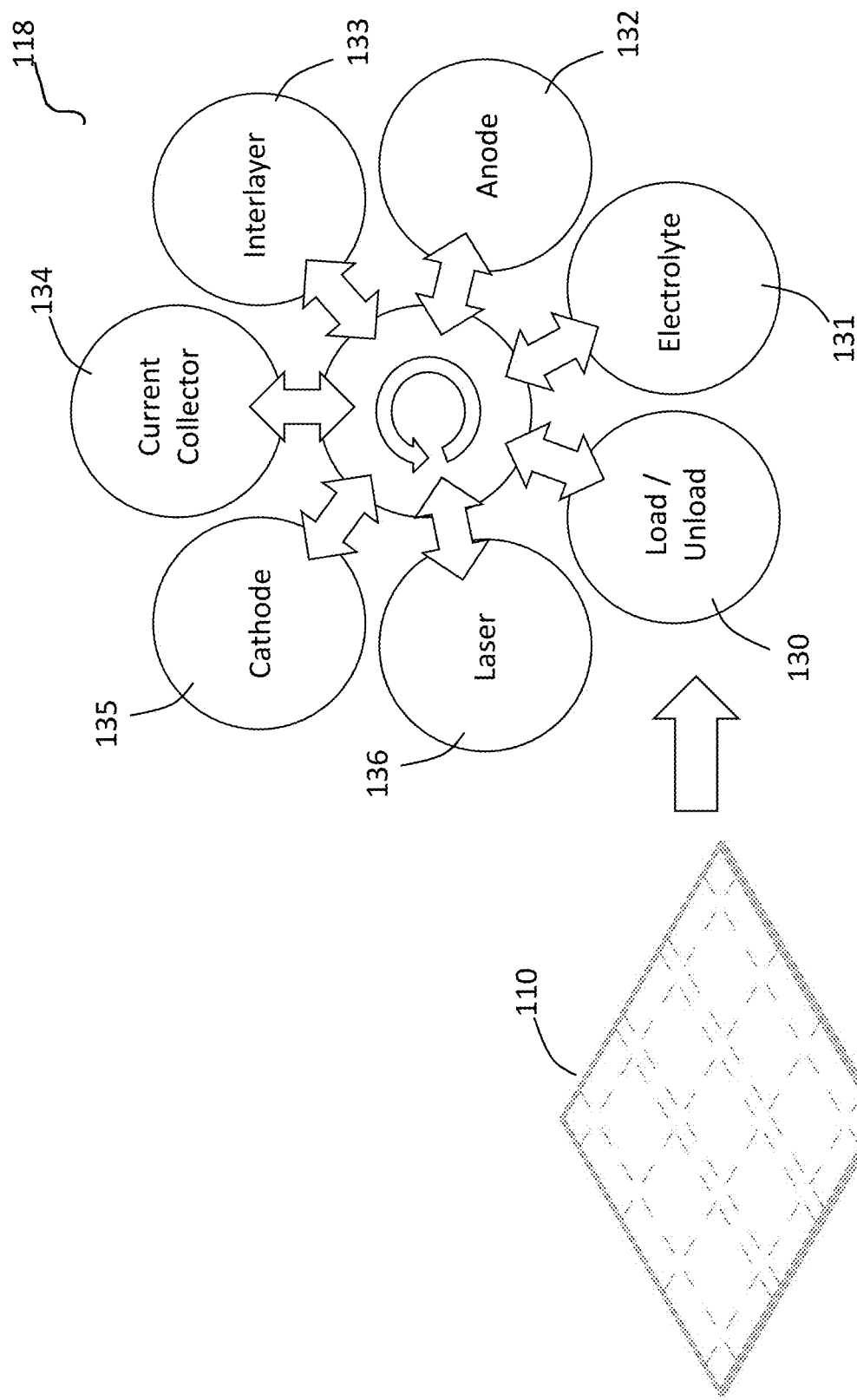
FIG. 4 shows a cluster tool, such that is commonly used in high volume semiconductor wafer processing.

An embodiment of the present invention, as shown in FIG. 3, uses widely available industrial tools to form a stack of solid-state thin film battery cells (20) by repeatedly depositing layers of thin film on a carrier substrate (10) while subjecting various layers or combinations of layers to laser ablation processes. For means of illustration, as shown in FIG. 4, a cluster tool (118) such that is used in semiconductor wafer processing, is used to describe the process. The cluster tool may have any number of chambers, including, but not limited to chambers that deposit current collector (134), anode (132), cathode (135), electrolyte (131), insulating layer (133), and chambers that may anneal, cure, or laser process (136). The chamber environments may include vacuum chambers, or load locked chambers with ambient argon or other inert atmosphere.

A carrier substrate made from any suitable material, including, but not limited to glass, ceramic, or metal is loaded into the cluster tool. The substrate can be a metal film. The substrate may be a nickel film as the nickel material is less susceptible to chemical leaching under the high temperatures created during the ablating process. The metal substrate may have grooves or cut away portions scored across the substrate surface, preferably in a longitudinal direction. This can reduce the weight of the substrate and can avoid parasitic weight losses and thereby increase the energy density of the resulting energy storage device. The thin-film layers will be deposited, isolated, electrically terminated, and separated into at least one solid-state thin film battery cell of a determined width and length. The deposited battery cell may reside on the substrate in the regions between the grooves or cut away portions.

Parallel Layer Deposition and Isolation

The carrier substrate (110) is loaded into the load/unload chamber (130) and the "Parallel Layer Deposition and Isolation" process here described is performed at least once. Referencing FIG. 5, the carrier substrate (210) moves to the current collector chamber (134) and the cathode current collector (212) is deposited. After, the substrate is moved to the cathode chamber (135) where the cathode (213) is deposited. The substrate is then moved to the laser chamber (136). In the laser chamber, the cathode (213) and cathode current collector (212) are ablated by a pulsed laser beam of appropriate pulse energy in a defined proximity to an anode side edge (226) without significantly impinging on the layer beneath the cathode current collector (which may be the carrier substrate (210), or previous battery stacks). This will leave a cathode laser ablation trench (221). The laser ablation may be repeated as many times as is necessary to ablate along all of the anode side edges (226).

The carrier substrate (210) is then moved into the electrolyte chamber (131) to deposit the electrolyte (214). The electrolyte (214) covers the cathode (213) and bridges the cathode laser ablation trench (221). The electrolyte will be slightly recessed in the cathode ablation trench (221). The substrate (210) is then moved into the anode chamber (132) where the anode (215) is deposited. The substrate (210) is then moved into the current collector chamber (134) where the anode current collector (216) is deposited. The anode and anode current collector will be slightly recessed in the cathode ablation trench (221). The substrate is then moved to the laser chamber (136) where the anode current collector (216) and the anode (215) are ablated by a pulsed laser beam of appropriate pulse energy in a defined proximity to the cathode side edge (228) without significantly impinging on the electrolyte (214), leaving an anode laser ablation trench (222). The laser motion may be repeated as many times as is necessary to ablate along all of the cathode side edges (228).

The substrate (210) is then moved into the interlayer chamber (133) to deposit an insulating interlayer (217). The insulating interlayer (217) covers the anode current collector (216) and bridges the anode laser ablation trench (222). The insulating interlayer will fill the recess over the cathode laser ablation trench (221) and the recess in the anode laser ablation trench (222) leaving a substantially planar surface. The resulting deposited and isolated layers comprise a layer of pre-termination battery cells (242). Optionally, the substrate may be returned to the current collector chamber and the sequence may be repeated as many times as desired, stacking N multiple layers of pre-termination battery cells (242) to create the pre-termination battery stack (243), where N is an integer greater than or equal to one. After creating the pre-termination battery stack (243), the substrate may be moved back to the laser chamber (136) for the termination process.

It is noted that in the described embodiment, the laser ablation isolation trenches are shared among multiple rows of batteries. This process scales well in high volume manufacturing, where only one laser ablation process is needed for a number of cells.

Termination

After the isolation process, the pre-termination battery stack (343) is moved into the laser chamber (136) for row-wise separation. In FIG. 6, a pulsed laser beam of appropriate pulse energy with at least one or multiple processing passes, is used to cut through all of the layers of the overall battery stack (343) in a defined proximity to at least two bounding edges (327), and scoring into the substrate (310) creating at least two laser cut trenches (363), and leaving at least one individual row of separated battery cell stacks (369), as well as two scrap rows (368). The battery stack is then moved to the interlayer chamber (133) to seal the exposed laser cut trenches (363) with a protective coating (301).

The battery stack is then moved back to the laser chamber (136) for column-wise separation and termination. A pulsed laser beam of appropriate pulse energy with at least one or multiple processing passes, is used to cut through all of the layers of the overall battery stack (343) in a defined proximity to either the anode side edges (326) or the cathode side edges (328) or in a defined area between the anode side edges (326) and the cathode side edges (328), and scoring into the substrate (310) in order to expose at least one anode edge (347) and at least one cathode edge (353) of the battery cell layers, leaving at least one individual column of a separated battery stack (354), at least two laser cut trenches (351) as well as at most two scrap columns (355).

The battery stack (343) is then moved to the current collector chamber (134). In an embodiment of this invention, at least one low accuracy mask (349) is situated over the battery stack in a defined location between at least one anode edge (347) and at least one cathode edge (353). The termination current collector (350) is deposited, coating the battery stack and covering at least one anode edge (347) and at least one cathode edge (353), creating the terminated battery stack (352). The low accuracy mask (349) keeps the termination current collector (350) from short circuiting the anode edge (347) and cathode edge (353) of the same battery stack. It is noted that the mask (349) has much lower accuracy requirements than traditional battery and semiconductor masking, lending favorably to high volume manufacturing.

In an alternative embodiment of the termination process, the battery may be deposited in the discharged state. This allows coating of termination current collector without a mask. The entirety of the battery stack would be coated, shorting the anode edge and cathode edge from the same cell. The termination current collector may then be laser ablated along the termination current collector isolation zones (374).

It is noted that in the described embodiment, the laser ablation termination trenches are shared among multiple rows and columns of batteries. This process scales well in high volume manufacturing, where only one laser ablation process is needed for a number of cells.

Separation

The terminated battery stack (352) may be removed as sheet and broken along the scored laser cut trenches (351, 363) by an automated process, splitting the substrate and termination current collector between the anode side edges (326) and the cathode side edges (328), and also along the bounding edges (327).

Parallel Alternating Stack Deposition and Isolation

The laser isolation process lends itself to creating alternate thin film battery stacks in order to further optimize parasitic mass. In one such stack, the mass of current collectors may be minimized by sharing a current collector between two parallel cathodes. FIG. 7a shows the layer arrangement schematically. In order to create the stack, thin film batteries are deposited in alternating order, anode to cathode, then cathode to anode. Laser ablation is used to isolate and electrically terminate the layers. The below description is for one group of N thin film battery stacks, but it can be recognized that these teachings are easily extended to multiple rows and columns of cells using the teachings in the description of "Parallel Deposition and Isolation."

Referring to FIG. 7b, a substrate (410) is coated with an anode (415). Laser ablation is used to isolate the anode from the cathode edge (453) of the thin film battery along the anode laser ablation trench (422) without significantly impinging on the layer beneath. A first electrolyte (414) is coated over the first anode (415) and the first anode laser ablation trench (422), leaving a slightly recessed region along the first anode laser ablation trench (422). A first cathode (413), a cathode current collector (412), and a second cathode (420) are then respectively coated over the first electrolyte (414), leaving a slightly recessed region along the first anode laser ablation trench (422). Laser ablation is used to isolate the second cathode, the cathode current collector, and the first cathode from the anode edge (447) of the thin film battery along the cathode laser ablation trench (421) without significantly impinging on the electrolyte layer (414) beneath. A second electrolyte (418), and a second anode (419) are respectively coated over the second cathode (420) and the cathode laser ablation trench (421), leaving a slightly recessed region along both the first anode laser ablation trench (422) and the cathode laser ablation trench (421). Laser ablation is used to isolate the second anode (419) from the cathode edge (453) at a slightly increased distance from the cathode edge (453) to avoid ablating within the first anode laser ablation trench (422). Ablation is performed without significantly impinging on the second electrolyte (418), creating a second anode laser ablation trench (423). An insulating interlayer (417) is deposited, covering the second anode (419) and bridging the second anode laser ablation trench (423). The insulating interlayer will fill the recess over the cathode laser ablation trench (421) and the recess in the first anode laser ablation trench (422) leaving a substantially planar surface. The resulting deposited and isolated layers comprise a layer of parallel alternating pre-termination battery cells (442). Optionally, the substrate may be returned to the current collector chamber and the sequence may be repeated as many times as desired, stacking N multiple layers of battery cells (442). After stacking N layers of battery cells, the substrate may be moved back to the laser chamber (136) for the termination process as previously described. After terminated, the multiple layers of battery cells are electrically connected in parallel as schematically illustrated in FIG. 7a.

Serial Stack Deposition and Isolation

In another solid-state thin film battery deposition, isolation, and termination method, it is possible to connect two or more of the battery layers together serially, and then connect groups of serially connected battery cells together in parallel. This gives the advantage of doubling (tripling, etc.) voltage at the same time increasing capacity by stacking serially connected battery cells in parallel. Laser ablation is used to isolate and electrically terminate the layers, at times from both the anode and cathode side of the battery stack, enabling the serial connection. FIG. 8a shows the layer arrangement schematically. The below description is for one group of N thin film battery stacks, but it can be recognized that these teachings are easily extended to multiple rows and columns of cells using the teachings in the description of "Parallel Deposition and Isolation."

Figure 8B:
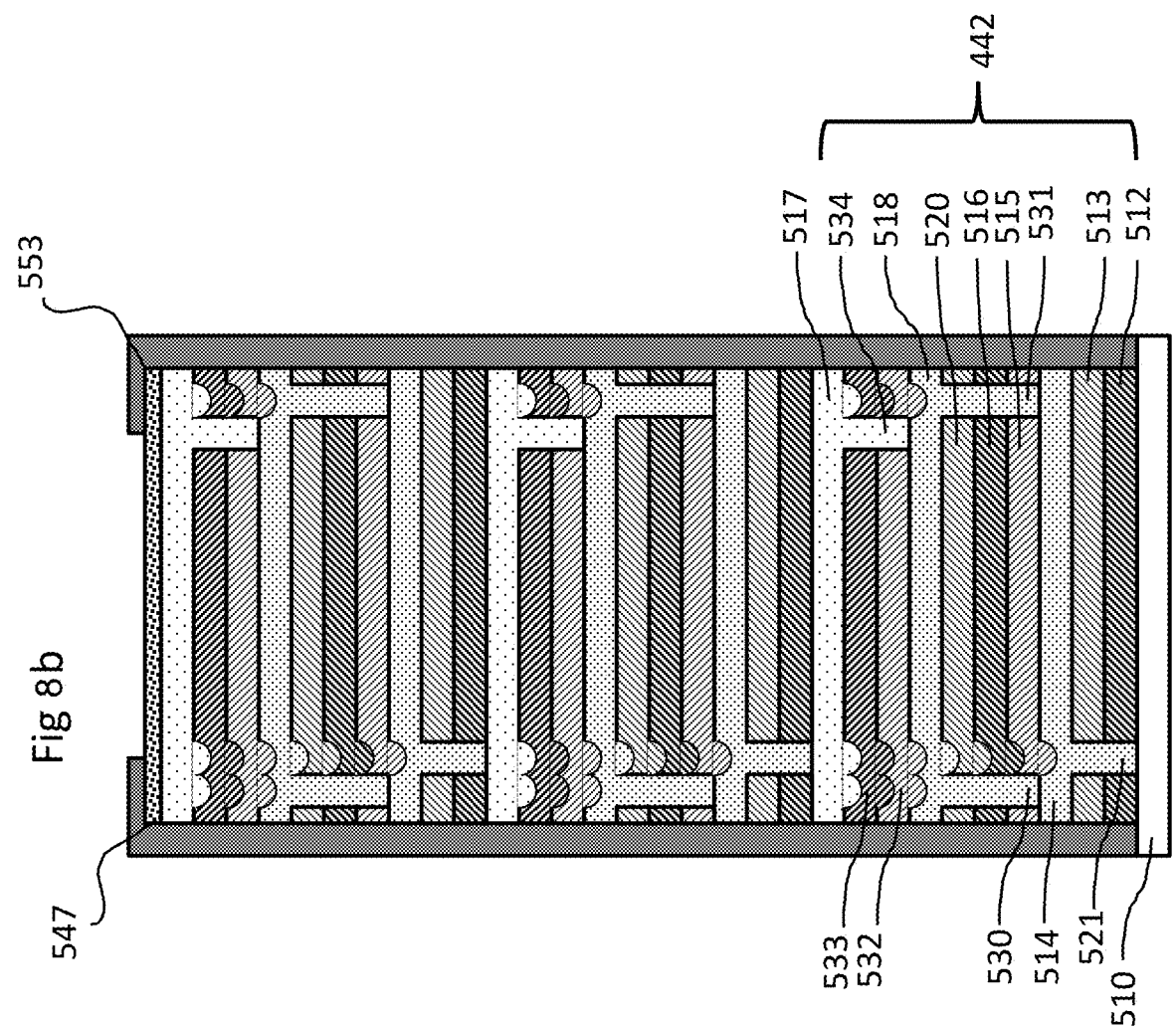
FIGS. 8a & b are simplified diagrams illustrating a method for fabricating and isolating a parallel connected serial multi-layered solid-state battery device according to an alternate embodiment of the present invention.
Figure 8A:
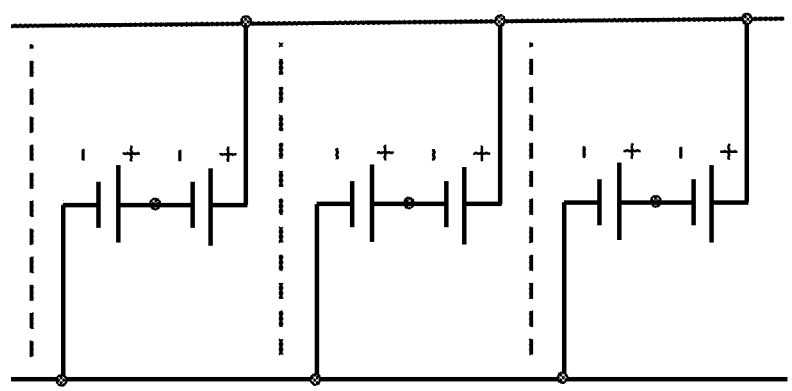

Referring to FIG. 8b, a substrate (510) is coated with a first cathode current collector (512) and a first cathode (513), respectively. Laser ablation is used to isolate the first cathode and first cathode current collector from the anode edge (547) of the thin film battery along the first cathode laser ablation trench (521) without significantly impinging on the layer beneath. The first cathode laser ablation trench (521) is at a slightly increased distance from the anode edge (547) to accommodate a subsequent second cathode laser ablation trench (530) without overlapping. A first electrolyte layer (514) is coated over the first cathode (513) and the first cathode laser ablation trench (521), leaving a slightly recessed region along the first cathode laser ablation trench (521). A first anode (515), a second cathode current collector (516), and a second cathode (520) are then respectively coated over the first electrolyte (514), leaving a slightly recessed region along the first cathode laser ablation trench (521). Laser ablation is used to isolate the second cathode (520), the second cathode current collector (516), and the first anode (515) from both the anode edge (547) and the cathode edge (553) of the thin film battery along the second cathode laser ablation trench (530) and the first anode laser ablation trench (531) without significantly impinging on the first electrolyte (514). A second electrolyte layer (518), a second anode (532) and a first anode current collector (533) are then respectively coated over the second cathode (520), the first anode laser ablation trench (531), the first cathode laser ablation trench (521), and the second cathode laser ablation trench (530), leaving slightly recessed regions along the laser ablation trenches (521, 530, 531). Laser ablation is used to isolate the first anode current collector (533) and the second anode (532) from the cathode edge (553) at a slightly increased distance from the cathode edge (553) to avoid ablating within the first anode laser ablation trench (531). Ablation is performed without significantly impinging on the second electrolyte layer (518) creating a second anode laser ablation trench (534). An insulating interlayer (517) is deposited, covering the first anode current collector (533) and bridging the second anode laser ablation trench (534). The insulating interlayer will fill the recess over the first cathode laser ablation trench (521), the second cathode laser ablation trench (530), and the first anode laser ablation trench (531) leaving a substantially planar surface. The resulting deposited and isolated layers comprise a layer of serial pre-termination battery cells (542). After stacking N layers of battery cells, the substrate may be moved back to the laser chamber (136) for the termination process as previously described. After terminated, multiple layers of serial battery cells are electrically connected in parallel as schematically illustrated in FIG. 8a.

EXAMPLES

By way of example, a laser ablation process for a solid-state thin film battery cell is described. The following explanation is for a specific stack of thin films with a specific laser type, wavelength, pulse energy, pulse repetition rate, laser process speed, and number of processing passes. It can be recognized that the laser ablation process can be achieved with other types of lasers, at different wavelengths, pulse energies, pulse repetition rates, process speeds, with different number of processing passes, on different thin film stacks, with different ablation and coating sequence order. This example is not meant to be comprehensive, only a specific example of the laser ablation process on a thin film battery stack.

Figure 9:
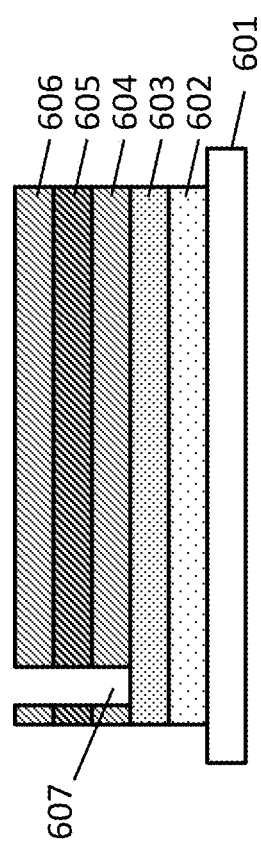
FIG. 9 is a simplified diagram of an example laser ablated stack.

A subset of the parallel alternating thin film stack from FIG. 7b is shown in FIG. 9. The example stack is composed of a substrate (601) coated, in order, with an insulating interlayer (602), an electrolyte (603), a first cathode (604), a cathode current collector (605), and a second cathode (606). It is desired to laser ablate through the second cathode (606), the current collector (605), and the first cathode (604) without significantly impinging on the electrolyte (603). This will leave a laser ablation trench (607).

In order to accomplish the laser ablation, an industrial laser with a pulse width of 15 ps, a wavelength of 355 nm, a pulse energy of 20 µJ, and a pulse repetition rate of 200 kHz, is steered by a galvanometer scanner with a clear aperture of 10 mm, through an F-theta lens of 330 mm focal length at a laser process speed of 7 m/s. The laser is scanned over the thin film stack in two processing passes.

The result of the first laser processing pass is shown in FIG. 10a. The laser ablation partially ablates the second cathode (702). The result of the second laser processing pass is shown in FIG. 10b. The laser ablation trench (707) is clearly shown, exposing the electrolyte (703). Further energy dispersive spectroscopy (EDS) analysis in FIG. 10c confirms that the unablated region of the sample are composed of cathode material (710) while the underlying electrolyte material (711) is exposed in the ablation trench.

Figure 11:
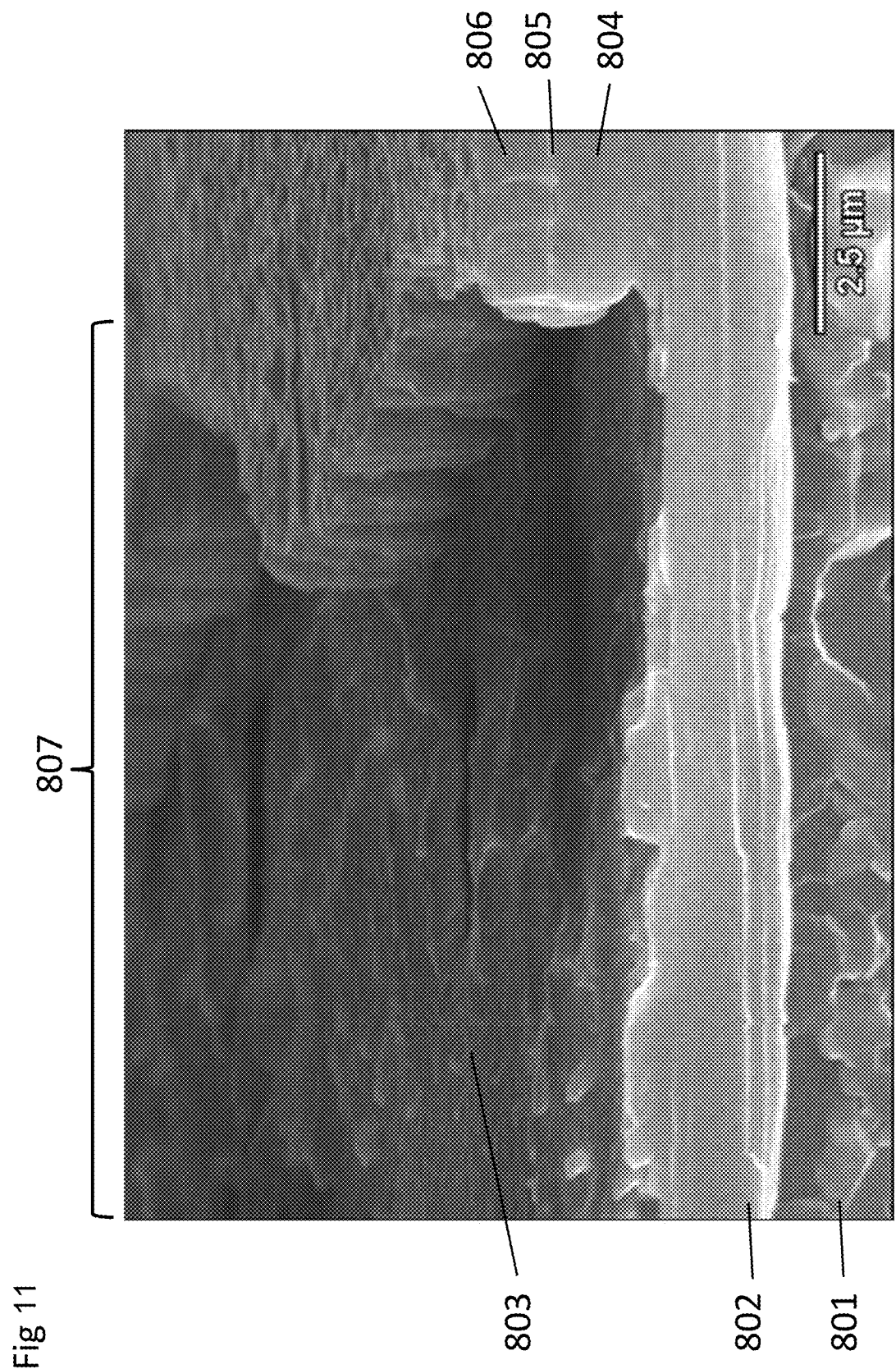
FIG. 11 is a scanning electron microscope image of the side of the laser ablation according to an example of the present invention showing a stack composed of a first cathode, a cathode current collector, and a second cathode, laser ablated to the underlying electrolyte.

An SEM cross section of the ablation trench is shown in FIG. 11. Shown are the substrate (801), the insulating interlayer (802), the electrolyte (803), the first cathode (804), the cathode current collector (805), the second cathode (806), and a portion of the laser ablation trench (807).

In an embodiment, the present invention provides a method for manufacturing an electrochemical cell for a solid state battery. The method includes providing a carrier substrate having a first surface region and coating the first surface region. The method includes defining a laser isolation region or regions over the carrier substrate at a spatial region within a vicinity of at least one completed electrochemical cell to be formed or formed. The method includes forming a first electrode member overlying the first surface region to cover the first surface region and forming any one of an anode current collector overlying the first electrode member, a cathode current collector, an anode member, or a cathode member, or any combination. In an embodiment, the method includes subjecting a first spatial region overlying the laser isolation region to a beam of electromagnetic radiation configured in one or more pulses to initiate removal of material to ablate the material can cause formation of a first opening through an entirety of a first thickness of the first electrode member while stopping at the first surface region. Subjecting a second spatial region overlying the laser isolation region of the first electrode member to a beam of electromagnetic radiation configured in one or more pulses to initiate removal of material to ablate the material can cause formation of a second opening through an entirety of a second thickness of the first electrode member while stopping at the first surface region. The method includes forming a second electrode member overlying the first electrode member to form an anode or a cathode.

In an embodiment, the method also includes forming a first electrolyte material overlying the first electrode member; and forming an Nth electrode member overlying the first electrode member, where N is an integer greater than 10. In an embodiment, the beam is provided from a laser source selected from one of a diode pumped solid state laser, a fiber laser, a semiconductor laser, or an excimer laser. In an embodiment, the laser isolation region is provided within a distance from at least one outer edge of the completed electrochemical cell such that the distance being less than 25% of a width of the completed electrochemical cell in order to reduce a loss of active energy density of the completed electrochemical cell; and depositing a fill material overlying the first opening to form a slightly recessed region; and forming an insulating material overlying the slightly recessed region to form a planarized surface region thereon.

In an embodiment, the laser isolation region comprises a plurality of isolation regions each of which is defined to be offset from another by less than 25% of a width of the completed electrochemical cell such that an upper recessed region is formed off-set from a lower recessed region and avoid geometric stack-up of a pair of recessed regions over the laser isolation region. In an embodiment, the laser isolation region is shared among a pair of neighboring cells such that the opening is provided using a single ablation process. In an embodiment, the beam is focused to a beam spot size of less than 5 mm in at least one axis in order to minimize the loss of active energy density of the electrochemical cell; and wherein the anode current collector and/or cathode current collector is configured as a diffusion barrier region. In an embodiment, the electrochemical cell is a solid state thin film battery deposited in a state of charge between 0% and 100%. In an embodiment, the forming an electrode material of the cathode current collector comprises depositing a material selected from at least one of Au, Pt, Cu, Ni, Ni—Cr, V, Al, Ti, Mn, among others. In an embodiment, the forming an electrode surface region of a cathode material comprises depositing a material selected from at least one of Mg doped LiNiO2, La doped LiMn2O4, La doped LiCoO2, LiMn2O4, LiNixCoyMn1-x-yO2, LiNixCoyAl1-x-yO2, LiCuxMn2-xO4, LiFexMn2-xO4, LiNixMn2-xO4, LiCoxMn2-xO4, LiFePO4, LiMnPO4, LiNiPO4, LiCoPO4, LiNiO2, LiCoO2, LiV2O5, LiAlxCo1-xO2, S, among others. In an embodiment, the forming of an electrolyte comprises depositing a material selected from at least one of LiSON, LixLa1-xZrO3, LixLa1-xTiO3, LiAlGePO4, LiAlTiPO4, LiSiCON, Li1.3Al0.3Ti1.7(PO4)3, 0.5LiTaO3+0.5SrTiO3, Li0.34La0.51TiO2.94, LiALCl4, Li7SiPO8, Li9AlSiO8, Li3PO4, Li3SP4, LiPON, Li7La3Zr2O12, Li1.5Al0.5Ge1.5(PO4)3, Li6PS5Cl, Li5Na3Nb2O12, among others. In an embodiment, the forming an electrode surface region of an anode material comprises depositing a material selected from at least one of LixMg1-x, LixAl1-x, Sn3N4, SnNxOy, GexO, Li, LiC6, LixSn, Li—Sn—Al, Li4Ti5O12, Li—Sb, Li—Bi, Li—In, Li—Si, among others. In an embodiment, the forming an electrode surface region of an anode current collector material comprises depositing a material selected from at least one of Au, Pt, Cu, Ni, Ni—Cr, V, Al, Ti, Mn, among others. In an embodiment, forming an insulating interlayer surface region comprises depositing a material selected from at least one of TPGDA (Tripropylene Glycol Diacrylate), TMPTA (Trimethylolpropane Triacrylate), PMPTMA (Trimethylolpropane Trimethacrylate), PETA (Pentaerythritol Triacrylate), DPGDA (Dipropylene Glycol Diacrylate), HDDA (1,6-Hexanediol Diacrylate), among others. Of course, there can be other variations, modifications, and alternatives.

The descriptions for the present invention and alternative embodiments teach the techniques of flexible isolation and termination of solid-state thin film battery stacks. These techniques minimize parasitic mass in the created cells and take advantage of readily available high volume manufacturing equipment and efficient processes that scale well to multiple battery stacks. It should be understood by those skilled in the art that changes to deposition or ablation order, as well as adding or removing layers or laser ablation sequences does not depart from the spirit of these teachings. The following claims are intended to include such variations.

The invention claimed is:

1. A method for manufacturing an electrochemical cell for a solid state battery, the method comprising:
providing a metal film substrate having a first surface region;
coating the first surface region;
forming a first electrode member overlying the first surface region;
subjecting a first spatial region to a beam of electromagnetic radiation in one or more pulses causing formation of a first opening through a first thickness of the first electrode member stopping at the first surface region;
forming an electrolyte layer having a second surface region overlying the first electrode member and filling the first opening;
forming at least one of an anode current collector, a cathode current collector, an anode member, or a cathode member overlying the electrolyte layer;
subjecting a second spatial region to a beam of electromagnetic radiation in one or more pulses causing formation of a second opening through a thickness of the at least one of an anode current collector, a cathode current collector, an anode member, or a cathode member stopping at the second surface region,
wherein the second opening is offset from the first opening.

2. The method of claim 1, further comprising subjecting a third spatial region overlying the first electrode member to a beam of electromagnetic radiation in one or more pulses causing formation of a second opening through a second thickness of the first electrode member stopping at the first surface region.

3. The method of claim 1, further comprising forming a second electrode member overlying the first electrode member to form an anode or a cathode.

4. The method of claim 1, further comprising forming an Nth electrode member overlying the first electrode member, where N is an integer greater than 10.

5. The method of claim 1, wherein the beam is provided from a laser source selected from one of a diode pumped solid state laser, a fiber laser, a semiconductor laser, or an excimer laser.

6. The method of claim 1, wherein the first spatial region is provided within a distance from at least one outer edge of the completed electrochemical cell such that the distance is less than 25% of a width of the completed electrochemical cell in order to reduce a loss of active energy density of the completed electrochemical cell.

7. The method of claim 1, further comprising depositing a fill material overlying the first opening to form a slightly recessed region; and forming an insulating material overlying the slightly recessed region to form a planarized surface region thereon.

8. The method of claim 1, wherein the second opening is offset from the first opening by less than 25% of a width of the electrochemical cell.

9. The method of claim 1, wherein the first spatial region is shared among a pair of neighboring cells such that the first opening is provided using a single ablation process.

10. The method of claim 1, wherein the beam is focused to a beam spot size of less than 5 mm in at least one axis in order to minimize the loss of active energy density of the electrochemical cell.

11. The method of claim 1, wherein at least one of the anode current collector and cathode current collector is configured as a diffusion barrier region.

12. The method of claim 1, wherein the electrochemical cell is a solid state thin film battery deposited in a state of charge between 0% and 100%.

13. The method of claim 1, wherein forming a cathode current collector comprises depositing a material selected from at least one of Au, Pt, Cu, Ni, Ni—Cr, V, Al, Ti, Mn;
wherein forming a cathode member comprises depositing a material selected from at least one of Mg doped LiNiO2, La doped LiMn2O4, La doped LiCoO2, LiMn2O4, LiNixCoyMn1-x-yO2, LiNixCoyAl1-x-yO2, LiCuxMn2-xO4, LiFexMn2-xO4, LiNixMn2-xO4, LiCoxMn2-xO4, LiFePO4, LiMnPO4, LiNiPO4, LiCoPO4, LiNiO2, LiCoO2, LiV2O5, LiAlxCo1-xO2, S;
wherein forming an electrolyte layer comprises depositing a material selected from at least one of LiSON, LixLa1-xZrO3, LixLa1-xTiO3, LiAlGePO4, LiAlTiPO4, LiSiCON, Li1.3Al0.3Ti1.7(PO4)3, 0.5LiTaO3+0.5SrTiO3, Li0.34La0.51TiO2.94, LiALCl4, Li7SiPO8, Li9AlSiO8, Li3PO4, Li3SP4, LiPON, Li7La3Zr2O12, Li1.5Al0.5Ge1.5(PO4)3, Li6PS5Cl, Li5Na3Nb2O12;
wherein forming an anode member comprises depositing a material selected from at least one of LixMg1-x, LixAl1-x, Sn3N4, SnNxOy, GexO, Li, LiC6, LixSn, Li—Sn—Al, Li4Ti5O12, Li—Sb, Li—Bi, Li—In, Li—Si; and
wherein forming an anode current collector comprises depositing a material selected from at least one of Au, Pt, Cu, Ni, Ni—Cr, V, Al, Ti, Mn.

14. The method of claim 1, wherein the metal film substrate comprises a nickel film.

15. The method of claim 1, wherein the first surface region of the metal film substrate has longitudinal grooves or cut away portions relative to the length of the metal film substrate.

16. The method of claim 15, wherein forming of the first electrode member is registered with the longitudinal grooves or cut away portions of the metal film substrate, such that the first electrode member is formed only on the first surface region of the metal film substrate between the grooves or cut away portions.

17. The method of claim 1, further comprising forming an insulating interlayer, wherein forming an insulating interlayer comprises depositing a material selected from at least one of TPGDA (Tripropylene Glycol Diacrylate), TMPTA (Trimethylolpropane Triacrylate), PMPTMA (Trimethylolpropane Trimethacrylate), PETA (Pentaerythritol Triacrylate), DPGDA (Dipropylene Glycol Diacrylate), and HDDA (1,6-Hexanediol Diacrylate).

18. A method for manufacturing an electrochemical cell for a solid state battery, the method comprising:
providing a substrate having a first surface region;
coating the first surface region;
forming a first electrode member overlying the first surface region;
subjecting a first spatial region overlying the first electrode member to a beam of electromagnetic radiation in one or more pulses causing formation of a first opening through a first thickness of the first electrode member stopping at the first surface region;
subjecting a second spatial region overlying the first electrode member to a beam of electromagnetic radiation in one or more pulses causing formation of a second opening through a second thickness of the first electrode member stopping at the first surface region;
forming an electrolyte layer having a second surface region overlying the first electrode member and filling the first opening and the second opening;
forming at least one of an anode current collector, a cathode current collector, an anode member, or a cathode member overlying the electrolyte layer; and
subjecting a third spatial region to a beam of electromagnetic radiation in one or more pulses causing formation of a third opening through a thickness of the at least one of an anode current collector, a cathode current collector, an anode member, or a cathode member stopping at the second surface region,
wherein the third opening is offset from each of the first opening and the second opening.

19. The method of claim 18, further comprising forming an Nth electrode member overlying the first electrode member, where N is an integer greater than 10.

20. The method of claim 18, wherein the beam is provided from a laser source selected from one of a diode pumped solid state laser, a fiber laser, a semiconductor laser, or an excimer laser.

21. The method of claim 18, wherein the first spatial region is provided within a distance from at least one outer edge of the completed electrochemical cell such that the distance is less than 25% of a width of the completed electrochemical cell in order to reduce a loss of active energy density of the completed electrochemical cell.

22. The method of claim 18, wherein the third opening is offset from each of the first opening and the second opening by less than 25% of a width of the electrochemical cell.

23. The method of claim 18, wherein the first spatial region is shared among a pair of neighboring cells such that the first opening is provided using a single ablation process.

24. The method of claim 18, wherein the beam is focused to a beam spot size of less than 5 mm in at least one axis in order to minimize the loss of active energy density of the electrochemical cell; and wherein at least one of the anode current collector and cathode current collector is configured as a diffusion barrier region.

25. The method of claim 18, wherein the electrochemical cell is a solid state thin film battery deposited in a state of charge between 0% and 100%.

26. The method of claim 18, wherein forming a cathode current collector comprises depositing a material selected from at least one of Au, Pt, Cu, Ni, Ni—Cr, V, Al, Ti, Mn;
wherein forming a cathode member comprises depositing a material selected from at least one of Mg doped LiNiO2, La doped LiMn2O4, La doped LiCoO2, LiMn2O4, LiNixCoyMn1-x-yO2, LiNixCoyAl1-x-yO2, LiCuxMn2-xO4, LiFexMn2-xO4, LiNixMn2-xO4, LiCoxMn2-xO4, LiFePO4, LiMnPO4, LiNiPO4, LiCoPO4, LiNiO2, LiCoO2, LiV2O5, LiAlxCo1-xO2, S;
wherein forming an electrolyte layer comprises depositing a material selected from at least one of LiSON, LixLa1-xZrO3, LixLa1-xTiO3, LiAlGePO4, LiAlTiPO4, LiSiCON, Li1.3Al0.3Ti1.7(PO4)3, 0.5LiTaO3+0.5SrTiO3, Li0.34La0.51TiO2.94, LiALCl4, Li7SiPO8, Li9AlSiO8, Li3PO4, Li3SP4, LiPON, Li7La3Zr2O12, Li1.5Al0.5Ge1.5(PO4)3, Li6PS5Cl, Li5Na3Nb2O12;

wherein forming an anode member comprises depositing a material selected from at least one of LixMg1-x, LixAl1-x, Sn3N4, SnNxOy, GexO, Li, LiC6, LixSn, Li—Sn—Al, Li4Ti5O12, Li—Sb, Li—Bi, Li—In, Li—Si; and wherein forming an anode current collector comprises depositing a material selected from at least one of Au, Pt, Cu, Ni, Ni—Cr, V, Al, Ti, Mn.

27. The method of claim 18, further comprising forming an insulating interlayer, wherein forming an insulating interlayer comprises depositing a material selected from at least one of TPGDA (Tripropylene Glycol Diacrylate), TMPTA (Trimethylolpropane Triacrylate), PMPTMA (Trimethylolpropane Trimethacrylate), PETA (Pentaerythritol Triacrylate), DPGDA (Dipropylene Glycol Diacrylate), and HDDA (1,6-Hexanediol Diacrylate).

\* \* \* \* \*